Feb. 22, 1927.  
J. A. DOLE  
DRIER  
Original Filed Sept. 15, 1925    3 Sheets-Sheet 2
1,618,176
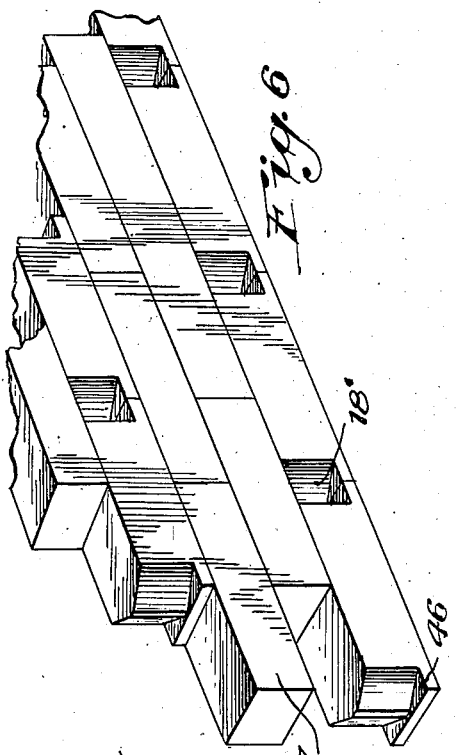
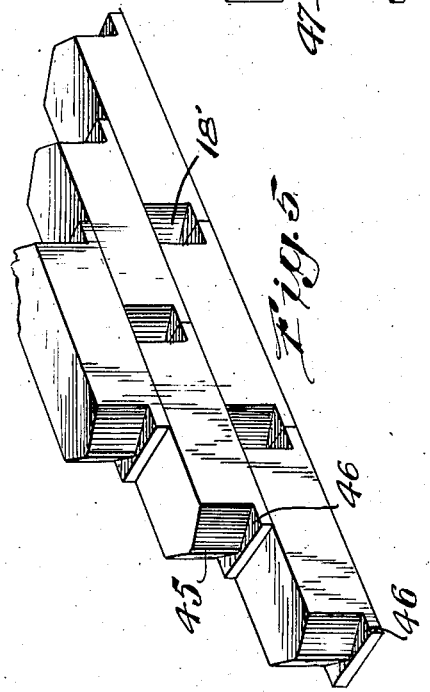
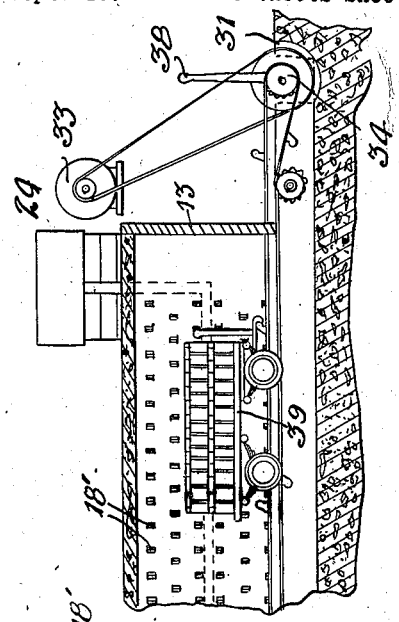
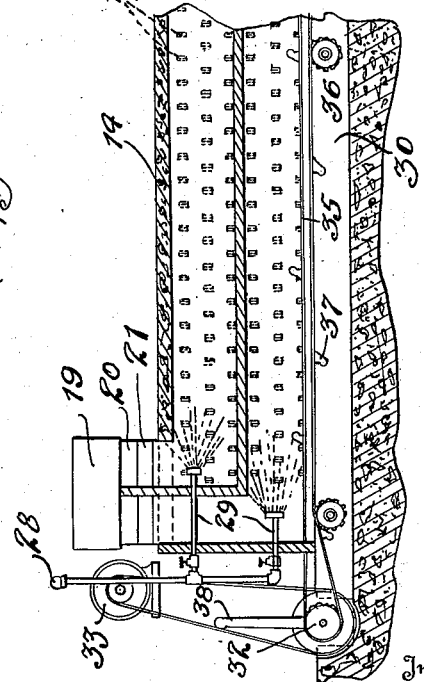
Inventor  
John A. Dole.

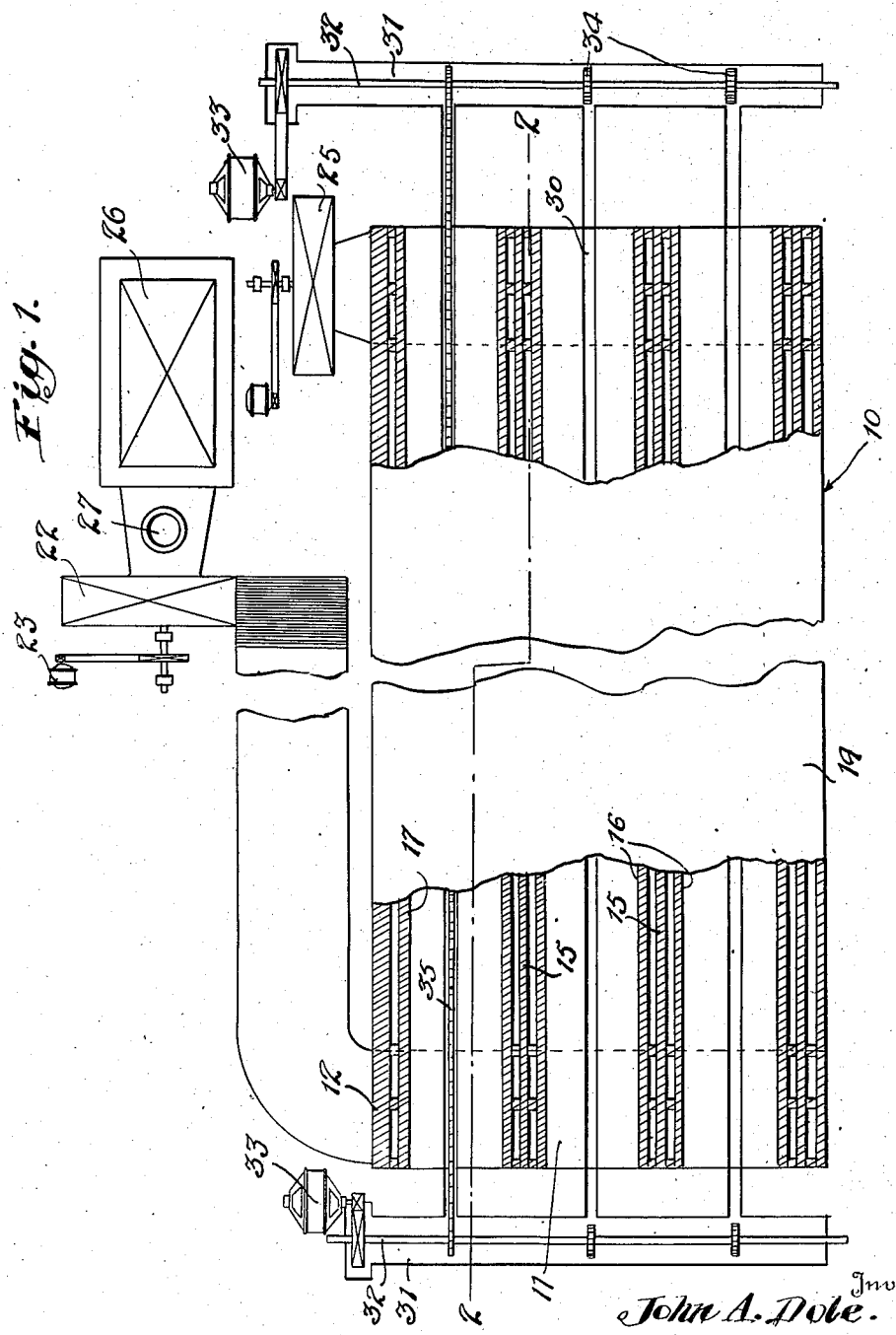

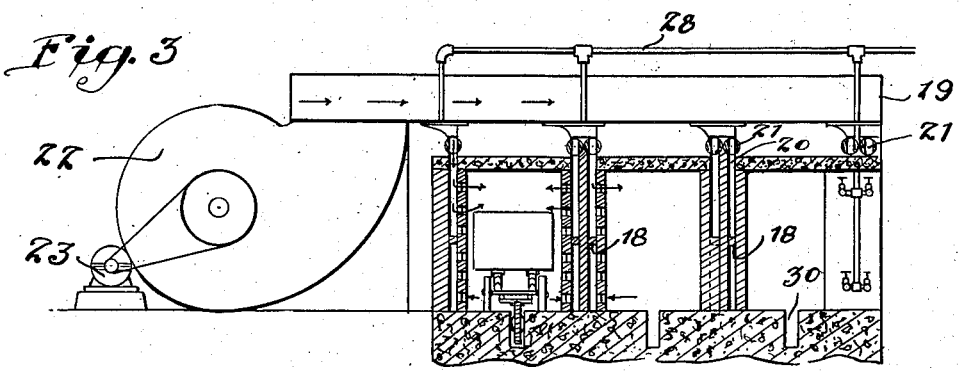

Patented Feb. 22, 1927.

1,618,176

UNITED STATES PATENT OFFICE.

JOHN A. DOLE, OF IRONTON, OHIO.

DRIER.

Application filed September 15, 1925, Serial No. 56,542. Renewed January 7, 1927.

My invention relates to improvements in driers and to a method of drying.

An important object of my invention is the provision of a drier wherein various materials such as bricks, tile or any product made from clays, shales, soils, or any product containing moisture may be successfully and efficiently dried.

A further object of my invention is to provide a device of this character in which the various conditions existing in the drier may be controlled and adjusted at all times.

A further object of my invention is the provision of a device of the above mentioned character which will be of simple construction, easily and economically operated, and highly efficient in results.

Other objects of my invention will be apparent during the course of the following description.

In the accompanying drawings which form a part of this specification wherein like characters of reference denote like or corresponding parts throughout the same, Figure 1 is a top plan view of my improved drier, parts being removed, Figure 2 is a longitudinal sectional view taken on the line 2—2 of Figure 1, Figure 3 is a transverse sectional view of the same, Figure 4 is an elevation of one of the end doors and its surrounding parts, Figure 5 is a detail perspective view of one form of wall construction, and Figure 6 is a similar view of another form of wall construction.

In the accompanying drawings wherein for the purpose of illustration is shown a preferred embodiment of my invention, the numeral 10 designates a drier casing comprising a base 11, side walls 12, end walls 13 and top 14. The top and base are preferably formed from concrete and the side walls of any suitable material such as concrete, bricks, or the like. The casing is divided into compartments by means of partitions running longitudinally thereof, said partitions each comprising a central wall 15 and outer walls 16 spaced at each side from said center wall. There are also walls 17 similar to compartment walls 16 spaced from the casing side walls as shown. It will be seen that chamwalls are provided between the outer walls 16 and central wall 15, and between walls 17 and 12. These chambers are divided centrally at 18 so as to form two longitudinally extending chambers at each side of the chambers.

The walls 16 and 17 are formed with a series of openings 18' communicating with the chambers, these openings allowing circulation of air.

An air duct 19 extends across the top of the casing at one end and communicates with the air chambers by means of passages 20, provided with valves 21. A fan 22, operated by a motor 23, connects with the air duct 19 and supplies air to the chambers, said supply of air being controlled by the valves 21.

A similar exhaust air duct 24 is arranged at the other end of the casing and is controlled in the same manner as the air duct 19. An exhaust fan 25 is connected to this duct to exhaust the air from the chambers.

A hot air furnace 26 connects with the fan 22 and is provided with a suitable air tempering valve 27. A steam line 28 has branches 29 extending into the air chambers, suitably controlled by valves, and sprays are arranged on the ends of the branches to properly diffuse the moisture to humidify the air in the chambers.

Each of the drying compartments is provided with a central, longitudinally extending gutter 30 which opens into transversely extending gutters 31 at either end of the casing. Drive shafts 32 are arranged in the gutters 31 and driven by motors 33. Sprocket wheels 34 are arranged opposite the gutters 30. Drag chains 35 pass over the sprocket wheels 34 and extend through the gutters 30. The lower length of the chains pass over idlers 36, and hooks 37 are arranged in spaced relation on the chain. The drive shafts are controlled by any suitable clutch mechanism operated by the levers 38, and the hooks 37 are adapted to engage suitable cars 39 upon which the material to be dried is placed.

The ends of the compartments are closed by doors 40, preferably of steel which are raised and lowered by means of the sheaves 41, worm and spur gear 42 and cable 43, the cable passing over pulleys 44 arranged as shown in Figure 4. The doors are notched at their lower ends to allow the drag chains and hooks to pass.

The walls 16 and 17 of the compartments are preferably formed of brick. A brick suitable for this purpose is shown in Figures 5 and 6. This brick has its ends tapered to a central point 45 spaced a slight distance from the end of the brick, the tapered walls not extending the full height of the brick but spaced from the bottom thereof so as to leave a flange 46 which projects a slight distance beyond the point 45, which is preferably flattened as shown. The bricks, when laid, have the adjacent flanges abutting so that an opening 18' is formed between them, said opening tapering from both sides to the middle. These bricks may be arranged one row above the other so as to present a staggered series of openings on each layer of bricks, as shown in Figure 5 or rows of plain bricks 47 may be interposed between the rows of pointed bricks in order to space the rows of openings, as shown in Figure 6.

In operation, the cars are brought into the compartments, and the doors tightly closed. Air is admitted to the chambers at one end and exhausted at the other. The air is preferably sent into one of the chambers at each side of the compartment, for instance the top, and exhausted at the other chamber, the bottom, or it might be taken in on the top on one side and on the bottom on the other side, or it might be taken in on all of one side and exhausted on the other. This is controlled by the valves 21 and may be changed during the drying operation. The steam may be admitted at any desired time and to any desired extent.

It will be seen that I have provided a device which will insure perfect distribution of air and control over the conditions existing in the drier.

While I have shown and described the preferred embodiment of my invention, it is to be understood that various changes in the size, shape, and arrangement of parts may be resorted to without departing from the spirit of my invention or the scope of the subjoined claims.

Having described my invention, what I claim and desire to protect by Letters Patent is:

1. In a device of the character described, a drying compartment, a pair of air chambers on each side thereof and communicating therewith, an intake air duct arranged at one end of the compartment and communicating with the chambers, valves arranged between the air duct and the chambers, a fan connected with said duct, a hot air furnace cooperating with the fan, a longitudinally extending gutter in said compartment, a drag chain arranged in said gutter, means to drive said chain, means to impart humidity to the air in the chambers, and means to exhaust air therefrom.

2. In a device of the character described, a drier casing, said casing being provided with partitions forming a plurality of drying compartments, the partitions each comprising an imperforate central wall and outer walls spaced from said central wall, said outer walls being provided with openings, the space between the outer and central walls being divided to form two longitudinally extending air chambers communicating with each of the compartments, an intake air duct extending across the end of the casing and communicating with the air chambers, valves arranged between the chambers and air duct, a fan connected with said duct, a hot air furnace cooperating with said fan, an air tempering valve arranged between the fan and furnace, an exhaust duct arranged at the other end of the casing and communicating with the air chambers, valves arranged between said duct and the chambers, an exhaust fan connected with said exhaust duct, gutters arranged in said compartments and communicating with transverse gutters at either end and outside of the casing, drive shafts arranged in said transverse gutters, sprockets arranged on said shafts, endless drag chains passing around said sprockets and operating in the gutters in the compartments, and means to impart humidity to the air in the chambers.

3. A brick for forming the walls of driers, and the like, said brick having its ends tapered to a point, the beveled ends terminating short of the full height of the brick thereby leaving a flange which projects beyond the pointed end of the brick, whereby when these bricks are laid with their flanged ends abutting, an opening will be formed between the bricks, said opening tapering from both sides to the middle and having its top closed by the lower portion of the brick of the row immediately above it.

4. In a device of the character described, a drier casing comprising a drying compartment having imperforate outer walls and perforate inner walls spaced from the outer walls to form air chambers at each side of the compartment, an air intake duct arranged adjacent the casing and communicating with one of the chambers, means to force heated air into the intake duct, and an endless conveyor extending entirely through and beyond said compartment.

5. In a device of the character described, a drier casing comprising a drying compartment having imperforate walls and perforate walls spaced therefrom and arranged interiorly thereof, the space between the perforate and imperforate walls being divided into upper and lower chambers at each side of the compartment communicating with the compartment, an air intake duct arranged adjacent one end of the casing and communicating with each of the chambers, an air exhaust duct arranged adjacent the other end of the casing and communicating with each of the chambers, valves arranged between the chambers and the air ducts whereby certain of the chambers will have communication with one of the ducts while others will communicate with the other duct, and means to draw the material to be dried through the compartment.

6. In a device of the character described, a drier casing, said casing being provided with partitions forming a plurality of drying compartments, the partitions each comprising an imperforate central wall and outer walls spaced from said central wall, said outer walls being provided with openings, the space between the outer and central walls being divided to form two longitudinally extending chambers communicating with each of the compartments, an air intake duct extending across the end of the casing and communicating with the air chambers, valves arranged between the chambers and air duct, a fan connected with said duct, a hot air furnace cooperating with said fan, an air tempering valve arranged between the fan and furnace, an air exhaust duct arranged at the other end of the casing and communicating with the air chambers, valves arranged between said duct and the chambers, an exhaust fan connected with said exhaust duct, and means to draw the material to be dried through the casing.

In testimony whereof I affix my signature.

JOHN A. DOLE.